US012591491B2

(12) United States Patent
Thomas et al.

(10) Patent No.: US 12,591,491 B2
(45) Date of Patent: Mar. 31, 2026

(54) INVESTIGATION PROCEDURES FOR VIRTUAL MACHINES

(71) Applicant: Rubrik, Inc., Palo Alto, CA (US)

(72) Inventors: Anita Thomas, San Jose, CA (US);
Wenchun Cheng, Los Altos, CA (US);
Shaomin Chen, San Jose, CA (US);
Junchao Zhang, Newark, CA (US);
Hongbo Zou, Santa Clara, CA (US);
Scott Wang, Fremont, CA (US);
Abhishek Kumar, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 19/340,639

(22) Filed: Sep. 25, 2025

(65) Prior Publication Data

US 2026/0023661 A1     Jan. 22, 2026

Related U.S. Application Data

(63) Continuation of application No. 17/973,456, filed on Oct. 25, 2022, now Pat. No. 12,436,849.

(51) Int. Cl.
G06F 11/14       (2006.01)
G06F 11/1446    (2026.01)
G06F 11/1482    (2026.01)

(52) U.S. Cl.
CPC ...... G06F 11/1484 (2013.01); G06F 11/1448 (2013.01); G06F 2201/84 (2013.01)

(58) Field of Classification Search
None
See application file for complete search history.

(56) References Cited

U.S. PATENT DOCUMENTS

| | | | | |
|---|---|---|---|---|
| 7,941,813 B1 * | 5/2011 | Protassov | ............... | G06F 21/53 |
| | | | | 710/33 |
| 11,307,882 B1 | 4/2022 | Zidenberg et al. | | |
| 2006/0021029 A1 * | 1/2006 | Brickell | .................. | G06F 21/51 |
| | | | | 726/22 |
| 2008/0133208 A1 | 6/2008 | Stringham | | |
| 2010/0115332 A1 * | 5/2010 | Zheng | ................. | G06F 11/1461 |
| | | | | 714/E11.091 |

* cited by examiner

*Primary Examiner* — Craig C Dorais
(74) *Attorney, Agent, or Firm* — Holland & Hart LLP

(57) ABSTRACT

A data management system (DMS) may facilitate an investigation procedure for a set of one or more virtual machines (VMs) hosted in a first environment. The DMS may receive an indication of a selection of one or more sets of VMs and corresponding snapshots for the investigation procedure. The corresponding snapshots may be stored in a second environment, and each snapshot may be associated with a version of a respective set of VMs. The DMS may mount the one or more sets of VMs to one or more testing environments different than the first and second environments. The mounting may use the snapshots stored in the second environment to provide the testing environments with query access to respective versions of the sets of VMs hosted in the first environment. The DMS may perform query operations between the first environment and the testing environments as part of the investigation procedure.

20 Claims, 10 Drawing Sheets

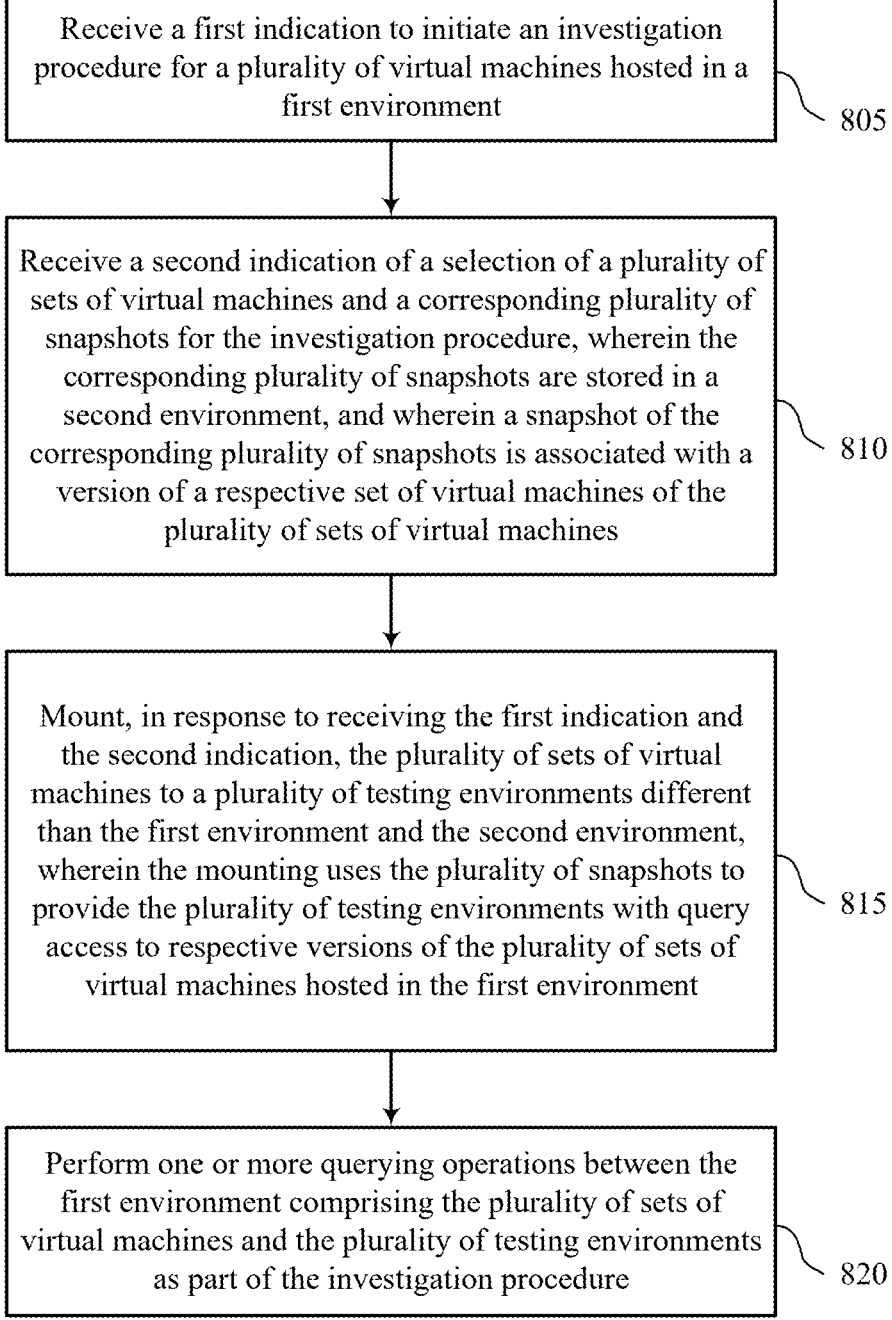

Receive a first indication to initiate an investigation procedure for a plurality of virtual machines hosted in a first environment

805

Receive a second indication of a selection of a plurality of sets of virtual machines and a corresponding plurality of snapshots for the investigation procedure, wherein the corresponding plurality of snapshots are stored in a second environment, and wherein a snapshot of the corresponding plurality of snapshots is associated with a version of a respective set of virtual machines of the plurality of sets of virtual machines

810

Mount, in response to receiving the first indication and the second indication, the plurality of sets of virtual machines to a plurality of testing environments different than the first environment and the second environment, wherein the mounting uses the plurality of snapshots to provide the plurality of testing environments with query access to respective versions of the plurality of sets of virtual machines hosted in the first environment

815

Perform one or more querying operations between the first environment comprising the plurality of sets of virtual machines and the plurality of testing environments as part of the investigation procedure

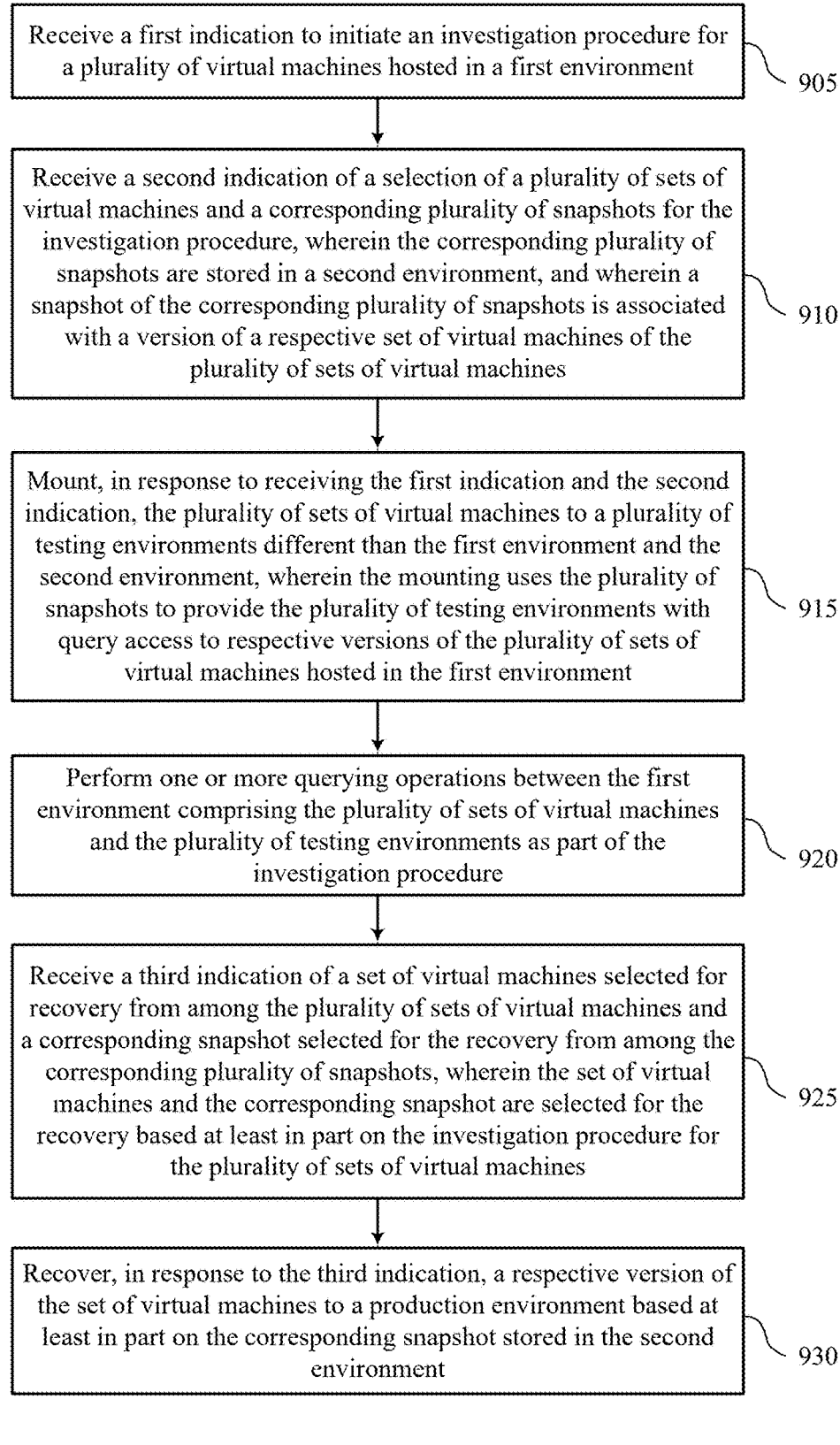

Receive a first indication to initiate an investigation procedure for a plurality of virtual machines hosted in a first environment

905

Receive a second indication of a selection of a plurality of sets of virtual machines and a corresponding plurality of snapshots for the investigation procedure, wherein the corresponding plurality of snapshots are stored in a second environment, and wherein a snapshot of the corresponding plurality of snapshots is associated with a version of a respective set of virtual machines of the plurality of sets of virtual machines

910

Mount, in response to receiving the first indication and the second indication, the plurality of sets of virtual machines to a plurality of testing environments different than the first environment and the second environment, wherein the mounting uses the plurality of snapshots to provide the plurality of testing environments with query access to respective versions of the plurality of sets of virtual machines hosted in the first environment

915

Perform one or more querying operations between the first environment comprising the plurality of sets of virtual machines and the plurality of testing environments as part of the investigation procedure

920

Receive a third indication of a set of virtual machines selected for recovery from among the plurality of sets of virtual machines and a corresponding snapshot selected for the recovery from among the corresponding plurality of snapshots, wherein the set of virtual machines and the corresponding snapshot are selected for the recovery based at least in part on the investigation procedure for the plurality of sets of virtual machines

925

Recover, in response to the third indication, a respective version of the set of virtual machines to a production environment based at least in part on the corresponding snapshot stored in the second environment

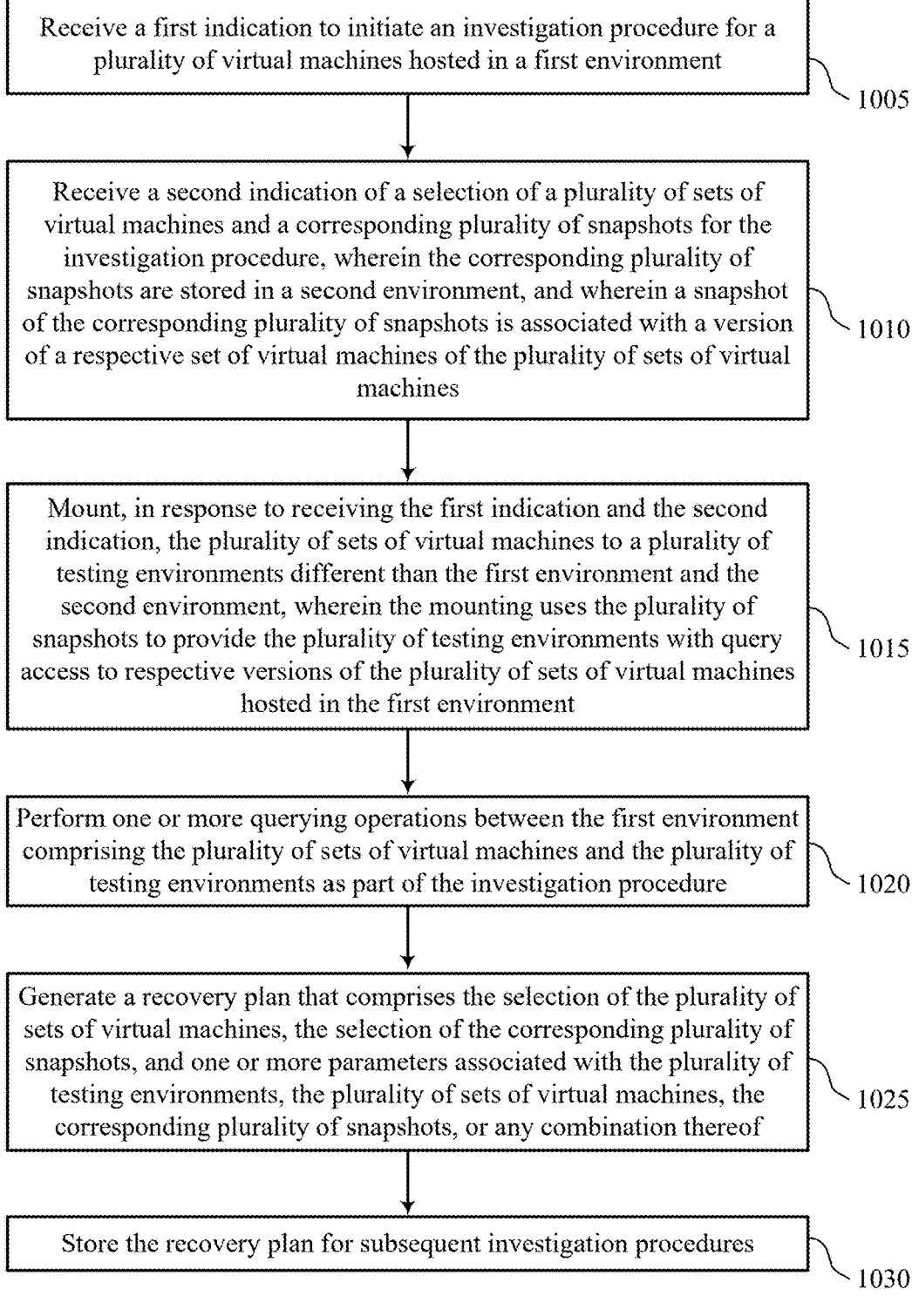

Receive a first indication to initiate an investigation procedure for a plurality of virtual machines hosted in a first environment

1005

Receive a second indication of a selection of a plurality of sets of virtual machines and a corresponding plurality of snapshots for the investigation procedure, wherein the corresponding plurality of snapshots are stored in a second environment, and wherein a snapshot of the corresponding plurality of snapshots is associated with a version of a respective set of virtual machines of the plurality of sets of virtual machines

1010

Mount, in response to receiving the first indication and the second indication, the plurality of sets of virtual machines to a plurality of testing environments different than the first environment and the second environment, wherein the mounting uses the plurality of snapshots to provide the plurality of testing environments with query access to respective versions of the plurality of sets of virtual machines hosted in the first environment

1015

Perform one or more querying operations between the first environment comprising the plurality of sets of virtual machines and the plurality of testing environments as part of the investigation procedure

1020

Generate a recovery plan that comprises the selection of the plurality of sets of virtual machines, the selection of the corresponding plurality of snapshots, and one or more parameters associated with the plurality of testing environments, the plurality of sets of virtual machines, the corresponding plurality of snapshots, or any combination thereof

1025

Store the recovery plan for subsequent investigation procedures

INVESTIGATION PROCEDURES FOR VIRTUAL MACHINES

CROSS REFERENCE

The present Application for Patent is a continuation of U.S. patent application Ser. No. 17/973,456 by THOMAS et al., entitled "INVESTIGATION PROCEDURES FOR VIRTUAL MACHINES," filed Oct. 25, 2022, assigned to the assignee hereof, and expressly incorporated by reference herein.

FIELD OF TECHNOLOGY

The present disclosure relates generally to database systems and data processing, and more specifically to investigation procedures for virtual machines.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 through 10 show flowcharts illustrating methods that support investigation procedures for virtual machines in accordance with aspects of the present disclosure.

DETAILED DESCRIPTION

Figure 1:
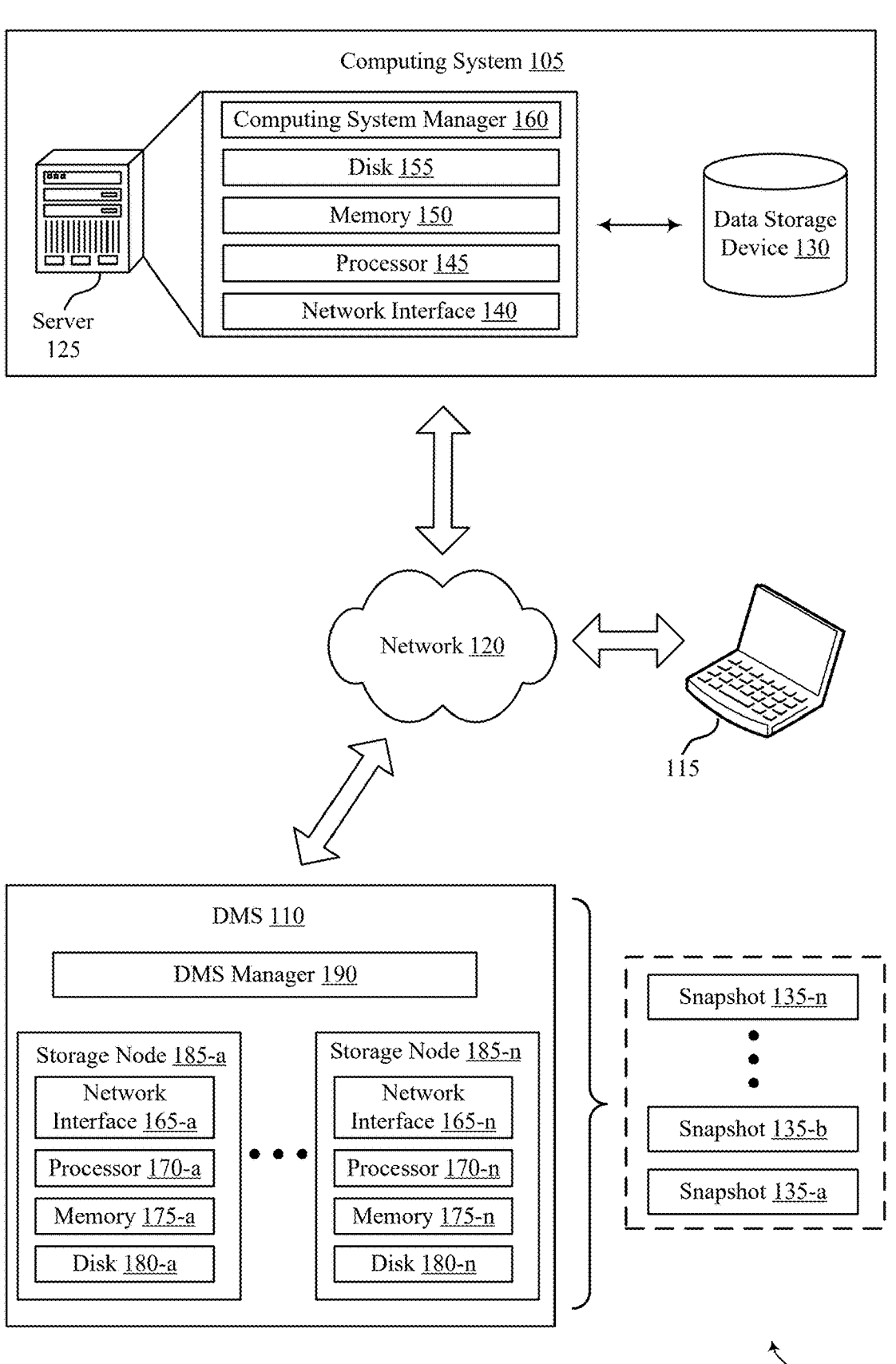
FIG. 1 illustrates an example of a computing environment that supports investigation procedures for virtual machines in accordance with aspects of the present disclosure.

A data management system (DMS) may backup and manage enterprise data for a client. The client's enterprise data may be maintained and operated on by the client in a production environment. The DMS may obtain snapshots of virtual machines (VMs) and other computing resources that execute in the production environment and store the snapshots in a snapshot storage environment. If the production environment is targeted in a ransomware attack, the client may identify which VMs were impacted and identify safe and reliable snapshots to use for recovering the VMs. Techniques, systems, and devices described herein provide for a DMS to orchestrate the recovery of VMs into one or more isolated recovery environments, which may be referred to as testing environments herein. The testing environments may be sandboxed environments that are local to the customer (e.g., in the same network as the customer's production environment). The DMS may facilitate an investigation procedure on the VMs in the testing environments, or the DMS may facilitate recovery of one or more of the VMs to the production environment (e.g., to replace the VMs that were targeted in the ransomware attack), or both.

The DMS may receive an indication to initiate the investigation procedure from the client or from an application at the DMS that is configured to detect cyber-attacks (e.g., threat hunting). In response, the DMS may present, via a user interface, computing resources (e.g., VMs) that are backed up by the DMS. The customer may select one or more sets of VMs and a respective snapshot from which each set of VMs may be recovered. The snapshots may correspond to point-in-time versions of the VMs and may be stored in the snapshot storage environment associated with the DMS. The client may indicate parameters associated with the one or more testing environments for the investigation procedure.

The DMS may mount each indicated set of VMs to a respective testing environment using the snapshots. The mounts may be live mounts, such that the client may access and use the mounted data in the testing environment, but the data (e.g., the snapshots) may be stored at a storage environment associated with the DMS. The DMS may facilitate investigation procedures by the client (e.g., testing or repair procedures) using the VMs mounted across the multiple testing environments by querying data between two or more of the snapshot storage environment that stores the snapshots, the production environment that hosts the VMs, and the testing environments. In some examples, each testing environment may host the same set of VMs at a different point-in-time, such that the client may test the set of VMs at different times to determine a most reliable or valid set of computing resources from which to recover a VM. In some aspects, the client may identify a most reliable or valid VM based on the investigation procedure, and the client may request that the identified one or more VMs be recovered to the client's production environment. The DMS may facilitate such a recovery procedure of the identified versions of the VMs to the production environment.

Aspects of the disclosure are initially described in the context of computer environments that support investigation procedures for VMs. Additional aspects of the disclosure are described with reference to flow diagrams and process flows. Aspects of the disclosure are further illustrated by and described with reference to apparatus diagrams, system diagrams, and flowcharts that relate to investigation procedures for VMs.

FIG. 1 illustrates an example of a computing environment 100 that supports investigation procedures for VMs in accordance with various aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165 (e.g., processors 170 (e.g., processors 170-a through 170-n), memories 175 (e.g., memories 175-a through 175-n), and disks 180 (e.g., disks 180-a through 180-n). The network interfaces 165 (e.g., network interfaces 165-a through 165-n) may enable the storage nodes 185 (e.g., storage nodes 185-a through 185-n) to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105 (e.g., snapshots 135-a, 135-b, through 135-n). A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

As described herein, the DMS 110 may support data backup, management, and recovery services for a production environment within the computing system 105. The production environment may host one or more VMs for a client. The DMS 110 may obtain and store snapshots of the VMs executing in the production environment. If the production environment is subject to a ransomware attack, one or more of the VMs may be corrupt or destroyed. To recover from such an attack and reduce or mitigate risk of a subsequent attack, the client may perform a disaster recovery procedure. For example, the client may identify which VMs were impacted and a time at which the VMs were impacted, identify a snapshot that can be used to recover the VMs, and recover the VMs to the production environment. In some aspects, the client may start the VMs in a non-production environment before replacing the production VMs to perform one or more testing operations on the VMs (e.g., attack simulations or patching vulnerabilities). Additionally, or alternatively, before recovering the VMs to the production environment (e.g., before replacing the existing production VMs), the client may power off the existing production VMs and preserve or store the production VMs for subsequent inspections.

Techniques described herein provide for the DMS 110 to facilitate efficient and reliable investigation procedures for multiple VMs, multiple versions of VMs, or both at a time. If the client's production environment is subject to a ransomware attack, or some other disaster, the client or an application in the DMS 110 may initiate the investigation procedure. The client may select one or more VMs and corresponding snapshots of the VMs to use for the investigation procedure. The DMS 110 may mount the selected VMs to respective testing environments, which may be local to the computing system 105. The DMS 110 may mount each VM to a respective testing environment in parallel. In some aspects, the client may select a same VM and different snapshots. In such cases, the DMS 110 may map use a respective snapshot to mount a version of the VM to each testing environment in parallel. The DMS 110 may perform querying operations between the testing environments and the snapshots stored in a snapshot storage location associated with the DMS 110 to facilitate the mounts. The client may utilize the mounts of the VMs in the testing environments to perform the investigation procedure. For example, the client may investigate multiple VMs, or multiple versions of a VM, or both across the different testing environments in parallel.

The client may, in some aspects, select one or more of the VMs for recovery to the production environment. For example, the client may identify one or more of the VMs that are suitable for replacing the VMs that were corrupted by the ransomware attack in the production environment. The client may instruct the DMS 110 to recovery the selected VMs to the production environment. The DMS 110 may thereby support multiple mounts of multiple VMs in parallel for an investigation procedure. By testing multiple VMs in parallel, the client may efficiently and accurately identify a high performing VM, repair one or more VMs, or both. Thus, the techniques described herein may reduce latency and improve reliability of investigation and recovery procedures for VMs after a cyber-attack.

One or more aspects of the disclosure may be implemented in a computing environment 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
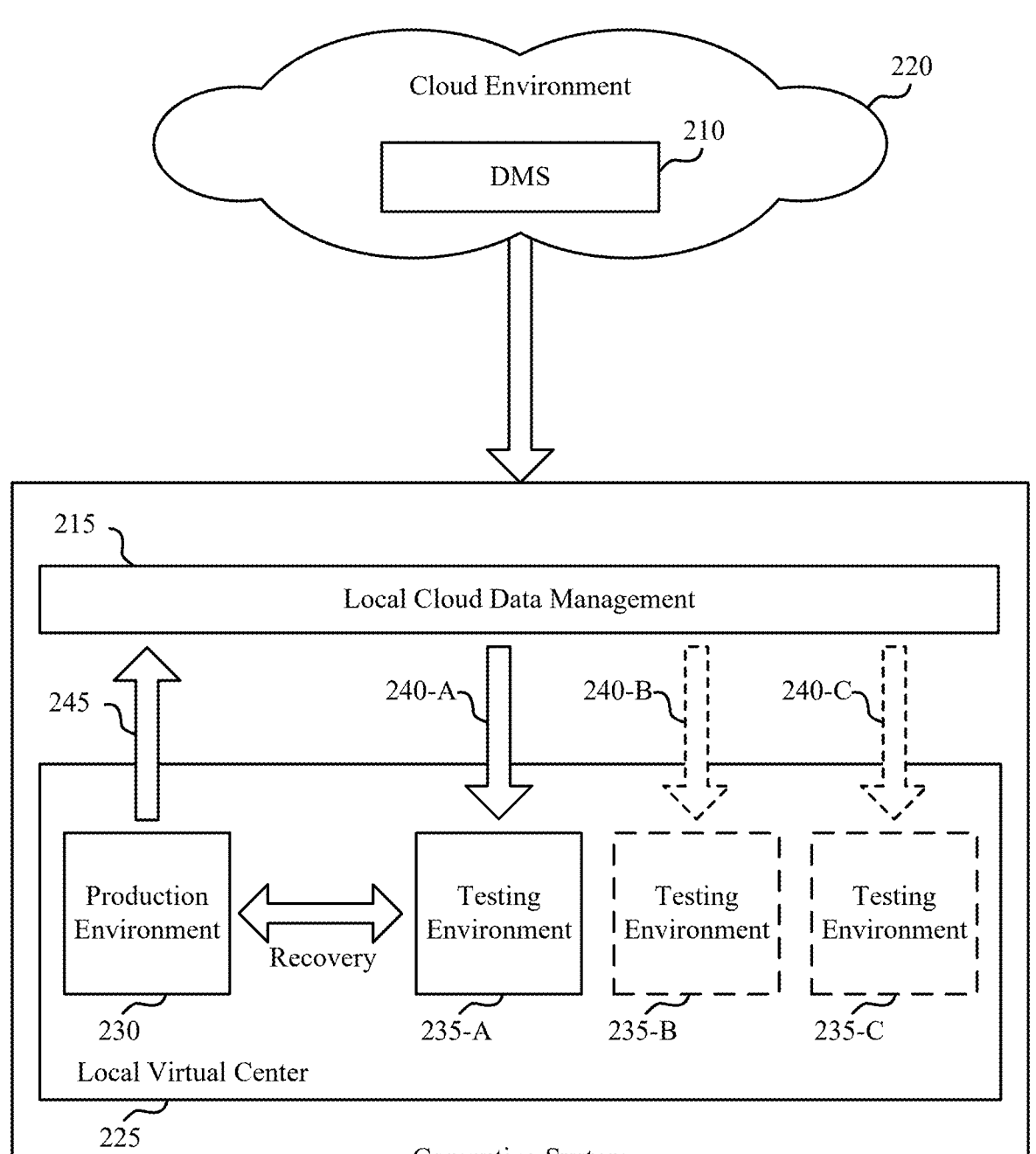
FIG. 2 illustrates an example of a computing environment that supports investigation procedures for virtual machines in accordance with aspects of the present disclosure.

FIG. 2 illustrates an example of a computing environment 200 that supports investigation procedures for VMs in accordance with aspects of the present disclosure. The computing environment 200 may implement or be implemented by aspects of the computing environment 100 described with reference to FIG. 1. For example, the computing environment 200 includes a DMS 210, which may represent an example of a DMS 110 as described with reference to FIG. 1. The DMS 210 may be hosted by a cloud environment 220 (e.g., a Google Cloud platform, or some other type of cloud environment 220). The DMS 210 may provide one or more data management services for the computing system 205, as described with reference to FIG. 1.

The computing system 205 may include a local virtual center 225, which may represent an example of a local server or database for managing or hosting computing resources for a client. For example, the local virtual center 225 may host a production environment 230. The production environment 230 may host one or more computing resources for a client (e.g., enterprise data). For example, one or more VMs may execute within the production environment 230.

The local cloud data management 215 may represent an example of a server, database, storage node, or set of computing resources that may interface with the DMS 210. The local cloud data management 215 may interface with the DMS 210 and the local virtual center 225 to provide data management services for the computing system 205. In some aspects, the local cloud data management 215 may be part of the DMS 210 that is local to the computing system 205 (e.g., a local portion or component of the DMS 210).

The DMS 210 may facilitate backups 245 of the enterprise data and computing resources hosted in the production environment 230. The DMS 210 may instruct the local cloud data management 215 to obtain the backups 245 of one or more computing resources, such as VMs, in the production environment 230. In some aspects, a client may request the backups 245 of the production environment 230, or the DMS 210 may obtain the backups 245 periodically or based on a trigger event, or both. The backups 245 may include snapshots and images of the computing resources in the production environment 230. The backups 245 may be stored in the local cloud data management 215, the DMS 210, another server or database location, or any combination thereof.

In some aspects, one or more VMs or other computing resources executing in the production environment 230 may be subject to a ransomware attack or some other disaster that may corrupt the resources. To recover from such an attack and reduce or mitigate risk of a subsequent attack, the client may perform a disaster recovery procedure. In some cases, the disaster recovery procedure may include identifying which VMs were impacted and a time at which the VMs were impacted, identifying a snapshot that can be used to recover the VMs, and recovering the VMs to the production environment 230. In some aspects, the client may start the VMs in a non-production environment before replacing the production VMs to perform one or more testing operations on the VMs (e.g., attack simulations or patching vulnerabilities). Additionally, or alternatively, before recovering the VMs to the production environment 230 (e.g., before replacing the existing production VMs), the client may power off the existing production VMs and preserve or store the production VMs for subsequent inspections.

Techniques, systems, and devices described herein provide for the DMS 210 to orchestrate investigation and recovery procedures for a client associated with the computing system 205. The DMS 210 may facilitate the recovery of one or more computing resources (which may be referred to as snappables, in some aspects) into one or more testing environments 235, which may be referred to as isolated recovery environments (IREs), in some aspects. The client may perform an investigation procedure on the computing resources in the testing environments 235. The investigation procedure may include, for example, penetration testing, attack and breach simulations, incident response scripts, patching vulnerabilities, or other testing procedures for the computing resources.

The testing environments 235 (e.g., testing environments 235-a, 235-b, and 235-c in FIG. 2) may represent examples of sandboxed environments, containerized environments, or both. For example, each testing environment 235 may be isolated or separated from the production environment 230, which may provide for any malware to be quarantined while scans and patching procedures are performed on the computing resources in the testing environments 235. In response to a cyber-attack, the isolated testing environments 235 may support safe and efficient investigation procedures while mitigating a risk of further spreading any malware to the production environment 230. The testing environments 235 may run on the same network or a different network from a network that the production environment 230 runs on. In some aspects, one or more ports or interfaces of the testing environments 235 may be open to support access to the computing resources by external services, such as online services for the testing procedures, or other services.

The investigation and recovery procedures described herein may be initiated by the client, by the DMS 210, or both. In some aspects, the procedures may be initiated in response to a disaster or attack to the production environment 230. For example, if one or more VMs executing in the production environment 230 go down or become corrupt, the client, the DMS 210, or both may initiate the procedures. In some aspects, the DMS 210 may include an application configured to defend against ransomware attacks (e.g., Radar). The application may monitor for potential signs of ransomware attacks or other cyber-attacks. In such cases, if the application detects an attack on the production environment 230, the application may indicate, to the DMS 210, to initiate the investigation and recovery procedure. For example, the application may call an application programming interface (API) that is configured to initiate the investigation procedure. Additionally, or alternatively, the client may initiate the procedure via a user interface randomly, periodically, or based on data associated with the VMs in the production environment 230.

The client may transmit one or more indications to the DMS 210 (e.g., via a user interface) to initiate the investigation procedure. In some aspects, the one or more indications may include parameters for the one or more testing environments 235. For example, the client may generate and manage the testing environments 235, and the client may indicate the testing environments 235 to be used for the investigation procedure. The one or more indications may additionally, or alternatively, include a selection, by the client, of multiple sets of VMs and a corresponding set of snapshots. The client may select the sets of VMs from among multiple VMs that execute in the production environment 230 of the client. The client may select the snapshots from among multiple snapshots of the selected VMs that have been obtained by the DMS 210 over time (e.g., via the backups 245). In some aspects, the DMS 210 may display, via a user interface, a list of VMs that are executing in the production environment 230 and a corresponding list of snapshots of the VMs that have been obtained and stored at the local cloud data management 215 or some other location associated with the DMS 210. The client may select the VMs and snapshots from the displayed list. Techniques for the selection and indication of the snapshots, the VMs, and the testing environments 235 are described in further detail elsewhere herein, including with reference to FIG. 4.

In response to the one or more indications from the client, the DMS 210 may use the selected snapshots to recover the selected sets of VMs to the one or more testing environments 235. For example, the DMS 210 may identify the selected snapshots and use the data stored in the snapshots to generate (e.g., replicate or recover) a corresponding version of the VM in the testing environment 235. Recovering the selected sets of VMs to the testing environments 235 may including mounting the selected sets of VMs to the testing environments 235.

By mounting the generated VMs to the testing environments, 235, the DMS 210 may refrain from transferring the data from the snapshot storage location to the testing environments 235. Rather, the data associated with the VMs (e.g., the snapshot) may be stored at the local cloud data management 215 (e.g., or the cloud environment 220, or some other snapshot storage location at which the backups 245 are stored) and the DMS 210 may provide the testing environments 235 with access to the data stored in the snapshot storage location (e.g., as a network file system (NFS) data store). The mounts 240 (e.g., the mounts 240-a, 240-b, and 240-c) may be examples of live mounts. In some aspects, providing access as part of the mounts 240 may include the DMS 210 facilitating one or more querying procedures between the local cloud data management 215 and the testing environments 235. By providing access via the live mounts 240, the DMS 210 may facilitate faster and more efficient investigation procedures as compared with transferring or exporting data associated with the VMs to the testing environments 235.

The DMS 210 may mount each selected set of one or more VMs to a respective testing environment. For example, the DMS 210 may execute the mount 240-a to mount a first set of one or more VMs to the testing environment 235-a, the DMS 210 may execute the mount 240-b to mount a second set of one or more VMs to the testing environment 235-b, and the DMS 210 may execute the mount 240-c to mount a third set of one or more VMs to the testing environment 235-c within the same time period. In some aspects, the first, second, and third sets of one or more VMs may include the same one or more VMs, but may be associated with different versions of the same one or more VMs. For example, the client may select a single VM for investigation procedures, and the client may select three snapshots associated with the VM. Each of the three snapshots may represent a respective version of the VM (e.g., different point-in-time versions). In such cases, the DMS 210 may facilitate live mounts 240 of the three versions of the VM in three testing environments 235 at the same time. Additionally, or alternatively, the first, second, and third sets of VMs may each include different VMs from the production environment 230.

The client may perform an investigation procedure for the VMs mounted to each of the testing environments 235 to determine whether to recover any one or more of the VMs to the production environment 230, to patch one or more vulnerabilities of the VMs, to obtain measurements for future disaster recovery or prevention procedures, or any combination thereof. The DMS 210 may execute the mounts 240-a, 240-b, and 240-c concurrently or in at least partially overlapping time periods, such that the client may perform the investigation procedures on multiple VMs or versions of VMs in multiple testing environments 235. The investigation procedures may include, for example, penetration tests, attack and breach simulations, execution of incident response scripts, patching vulnerabilities of the VMs, or any combination thereof.

In some aspects, the client may perform the investigation procedures by accessing the testing environments 235 and performing querying operations to access the VMs that are mounted via the mounts 240 to the testing environments 235. For example, the client may access, via the testing environment 235-a, data that is stored in the local cloud data management 215 and that is associated with a version of a VM via the mount 240-a.

After performing the investigation procedure for the multiple selected sets of VMs across the multiple testing environments 235, the client may identify one or more VMs for recovery. The client may select the one or more VMs based on performance during the investigation procedure. For example, the client may select a VM that is the most resistant to simulated attacks, or that was patched during the investigation procedure, or both. The client may indicate the selected VMs to the DMS 210 (e.g., via the user interface). The client may select which VMs to recover and which snapshots to use for the recovery. For example, the client may select a certain version of the selected VMs for recovery to the production environment 230. The DMS 210 may facilitate recovery of the selected VMs to the production environment 230 using the selected snapshots.

To recover the VMs to the production environment 230, the DMS 210 may perform a mount to mount the selected VMs to the production environment 230, or the DMS 210 may export the VMs to the production environment 230, or both. To export the VMs, the DMS 210 may transfer data from the snapshots of the VMs stored in the local cloud data management 215 to the production environment 230, such that the recovered VMs are stored in and execute in the production environment 230. To perform a mount, the DMS 210 may provide access to the VMs via the production environment 230, but the data associated with the VMs may be stored elsewhere, such as in the local cloud data management 215. In some aspects, the DMS 210 may remove or delete some or all of the VMs that currently execute in the production environment 230 before recovering the selected VMs to the production environment 230. The recovered VMs may execute in the production environment 230 and may replace other VMs that may have been corrupted during the cyber-attack.

The DMS 210 described herein may thereby facilitate investigation procedures for multiple sets of VMs across multiple different sandboxed testing environments 235 in parallel. The DMS 210 may additionally, or alternatively, facilitate recovery of one or more of the sets of VMs to a production environment 230 based on the investigation procedures. By orchestrating such investigation procedures for multiple VMs in parallel, the DMS 210 may support improved testing by a client in response to a cyber-attack, such as a ransomware attack. The testing may be performed efficiently and securely to improve reliability of cyber recovery and reduce processing and overhead.

Figure 3:
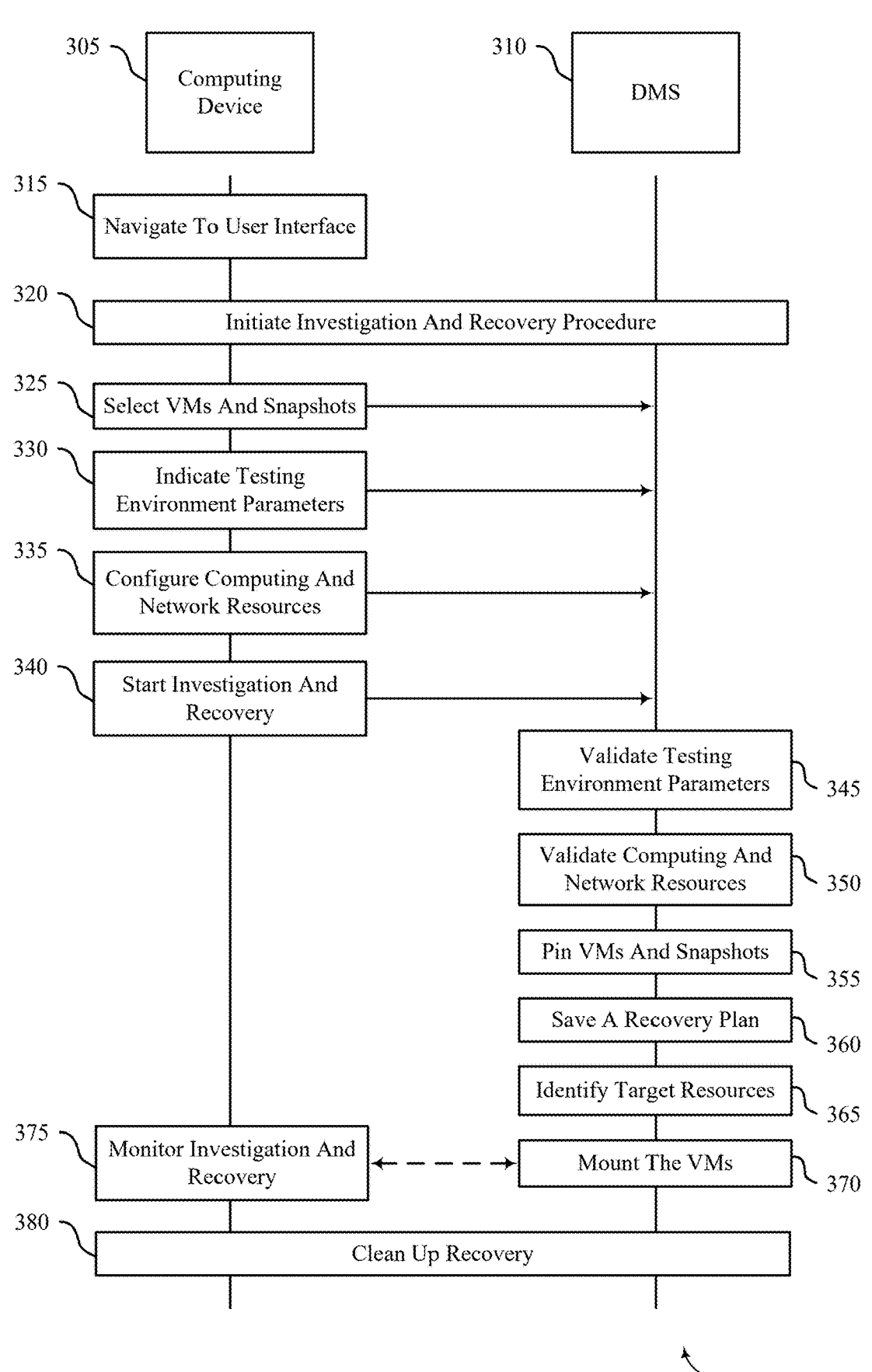
FIG. 3 illustrates an example of a flow diagram that supports investigation procedures for virtual machines in accordance with aspects of the present disclosure.

FIG. 3 illustrates an example of a flow diagram 300 that supports investigation procedures for VMs in accordance with aspects of the present disclosure. The flow diagram 300 may implement or be implemented by aspects of the computing environments 100 and 200 described with reference to FIGS. 1 and 2. For example, the flow diagram 300 may be implemented by a client that operates a computing device 305 and a DMS 310, which may represent examples of a computing device and a DMS as described with reference to FIGS. 1 and 2. In this example, the computing device 305 and the DMS 310 may execute one or more operations to facilitate investigation procedures for one or more VMs that execute in a production environment using snapshots of the VMs stored in a snapshot storage environment. The computing device 305 may interface with the DMS 310 via a computing network, as described with reference to FIG. 1. In some aspects, the computing device 305 may display, to a user (e.g., the client), a user interface that represents information from the DMS 310.

In some aspects, the operations illustrated in the flow diagram 300 may be performed by hardware (e.g., including circuitry, processing blocks, logic components, and other components), code (e.g., software or firmware) executed by a processor, or any combination thereof. For example, aspects of the flow diagram 300 may be implemented or managed by a cloud data management service, an export adapter, or some other software or application within a DMS 310 that is configured to manage backup and restoration of data and other computing resources within one or more production environments. Alternative examples of the following may be implemented, where some steps are performed in a different order than described or are not performed at all. In some cases, steps may include additional features not mentioned below, or further steps may be added.

At 315, the user of the computing device 305 may navigate to the user interface associated with the DMS 310. At 320, the computing device 305, the DMS 310, or both may initiate an investigation and recovery procedure. If the computing device 305 initiates the investigation procedure, the computing device 305 may transmit an indication of the initiation of the investigation and recovery procedure to the DMS 310. In some aspects, the investigation and recovery procedure may be initiated by an application of the DMS 310, and the computing device 305 may receive an indication of the initiation, as described with reference to FIG. 2.

At 325, the user of the computing device 305 may select one or more sets of VMs from among multiple VMs that execute in a production environment of the client. The user may select one or more corresponding snapshots from among multiple snapshots of the selected VMs that may be stored by the DMS 310. In some aspects, the user interface may display a list of candidate VMs and snapshots for the user to select from. In some aspects, the selection of the one or more sets of VMs and corresponding snapshots may be transmitted to the DMS 310 via the user interface.

In some aspects, the user may select the VMs from among the multiple VMs that execute in the production environment randomly. In some other aspects, VMs may be selected based on threat hunting or based on a recovery plan saved at the DMS 310, or both. For example, the DMS 310 may include an application configured to monitor the production environment of the client for potential cyber security threats or attacks. If the application (e.g., Radar) detects an attack or a threat to the production environment, the application may trigger the investigation procedure and may indicate which VMs are targeted by the attack. The client may select the VMs based on the indication. Additionally, or alternatively, the client may select the VMs based on an application of the VMs, based on one or more parameters associated with the VMs, or both.

At 330, the computing device 305 may indicate, to the DMS 310, parameters associated with one or more testing environments for use during the investigation and recovery procedures. The testing environments may represent examples of the testing environments 235 described with reference to FIG. 2. For example, the testing environments may be sandboxes within a virtual center of a computing system associated with the client. The testing environments may be previously generated environments, or may be generated in response to initiating the investigation and recovery procedure at 320. The parameters may indicate a size or location of the testing environments, among other information.

At 335, the user of the computing device 305 may configure one or more computing resources, network resources or both. The computing device 305 may indicate the configured resources to the DMS 310. The computing (e.g., compute) resources may correspond to infrastructure resources that provide processing capabilities, such as processors, memory, operating systems, other computing resources within a computing system (e.g., resource pools, distributed resource scheduler (DRS) clusters), or any combination thereof. With reference to the computing environment 200 described with reference to FIG. 2, the computing resources may correspond to resources within the local virtual center 225 of the computing system 205 illustrated in FIG. 2. The network resources may correspond to resources or parameters such as a network name associated with one or more VMs, an IP configuration session, other network resources or settings for a network connection, or any combination thereof. Although not illustrated in FIG. 3, the DMS 310 may, in some aspects, identify or obtain the network resources and may indicate the network resources to the computing device 305 for confirmation.

At 340, in some aspects, the client may confirm and start the investigation and recovery procedure. In some aspects, the client may send, via the computing device 305, an indication that triggers the investigation and recovery procedure. Additionally, or alternatively, the start of the investigation and recovery procedure may be triggered by one or more other actions performed by the client, the DMS 310, or both. For example, the client may confirm the network resources obtained by the DMS 310 at 335, and the confirmation may initiate the investigation and recovery procedure. Additionally, or alternatively, the investigation and recovery procedure may begin at 320 with the first indication transmitted by the client, or at some other time. The DMS 310 may facilitate the investigation and recovery procedure based on the initiation, as described by the following steps.

At 345, the DMS 310 may validate the testing environment parameters received from the computing device 305.

That is, the DMS 310 may verify whether the parameters provided to the DMS 310 are valid. In some aspects, the DMS 310 may access metadata associated with the testing environments and may verify the parameters locally based on the metadata. Additionally, or alternatively, the DMS 310 may connect to a local virtual center that includes the testing environments to verify the testing environment parameters.

At 350, the DMS 310 may validate the computing and network resources. That is, the DMS 310 may verify whether the computing and network resources are valid. The DMS 310 may validate the computing resources based on metadata stored at the DMS 310, or the DMS 310 may connect to a local virtual center associated with the computing resources to validate the resources. The DMS 310 may validate the network resources based on metadata stored at the DMS 310 or based on establishing a network connection.

At 355, the DMS 310 may pin the VMs and corresponding snapshots selected for the investigation and recovery procedure. For example, the DMS 310 may pin the snapshots for each of the selected VMs to prevent the snapshots from expiring and being subject to garbage collection operations during the investigation procedure.

At 360, in some aspects, the DMS 310 may save a recovery plan for future investigation and recovery procedures. The recovery plan may correspond to a group of objects (e.g., VMs) and corresponding snapshots, computing resources, network resources, and other parameters. In the example of FIG. 3, the DMS 310 may obtain a configuration or plan for the investigation and recovery and, at 360, the DMS 310 may optionally save the configuration in the form of a recovery plan for use in subsequent investigation and recovery procedures. If the client triggers a subsequent investigation and recovery procedure, the DMS 310 may retrieve the recovery plan and utilize the recovery plan for the investigation and recovery procedure. In such cases, the procedure may be more efficient because the client and the DMS 310 may refrain from selecting and validating VMs, snapshots, and corresponding parameters.

In some aspects, the DMS 310 may ask the client whether to save the configuration as a recovery plan, and the client may indicate, via the computing device 305, whether the DMS 310 should store the recovery plan. In some aspects, the DMS 310 may store multiple recovery plans each associated with one or more VMs. A VM may be associated with more than one recovery plan. For example, a first recovery plan may be associated with a first VM (VM1), a second VM (VM2), and a third VM (VM3). A second recovery plan saved at the DMS 310 may be associated with the third VM3, a fourth VM (VM4), and a fifth VM (VM5). As such, the third VM3 may belong to at least two different recovery plans. In some aspects, different recovery plans associated with the same VMs may be configured for different recovery targets (e.g., different testing environments, different production environments or both).

At 365, the DMS 310 may identify or set up (e.g., configure) one or more target resources for recovery. The target resources may correspond to a VM folder, a resource pool, or some other resources to which the VMs may be recovered. In some aspects, the VMs may be mounted to the identified target resources (e.g., folders) for investigation procedures, or the VMs may be recovered (e.g., exported) to the target resources for the investigation procedures or for recovery after a cyber-attack. In some aspects, the DMS 310 may identify or configure the target resources based on the computing and network resources identified previously, or based on an indication from the client, or based on or more other parameters, or any combination thereof.

At 370, the DMS 310 may mount the VMs that were selected for the investigation and recovery procedure. The DMS 310 may mount each set of VMs to a respective testing environment based on the testing environment parameters and the VM selections. The mounts may be live mounts, and may represent examples of the mounts 240 described with reference to FIG. 2.

At 375, the client may monitor, via the computing device 305, the investigation and recovery procedure. In some aspects, the monitoring may occur in parallel with the mounting of the VMs. For example, the DMS 310 may perform one or more querying operations between a local CDM where snapshots of the VMs are stored and the testing environments to provide the computing device 305 with access to the mounted versions of the VMs through the testing environments. The computing device 305 may access the VMs through the testing environments and perform one or more investigation procedures to test or repair the VMs. In some aspects, the client may select a set of one or more VMs for recovery based on the investigation procedure, and the computing device 305 may transmit an indication of the selection to the DMS 310. The DMS 310 may mount or export the indicated VMs to a production environment of the client as part of the recovery. Querying operations to support such investigation and recovery procedures are described in further detail elsewhere herein, including with reference to FIGS. 2 and 4.

At 380, the computing device 305, the DMS 310, or both may clean up or finish the recovery. For example, the DMS 310 may terminate the mounts of the VMs. The DMS 310 may, in some aspects, unpin the snapshots, such that the snapshots may not be exempt from garbage collection procedures after the investigation and recovery procedure is complete. In some aspects, the client may manually delete or reconfigure the one or more testing environments and the VMs and computing resources within them to be used for other investigation procedures or to reclaim the resources for other purposes.

Figure 4:
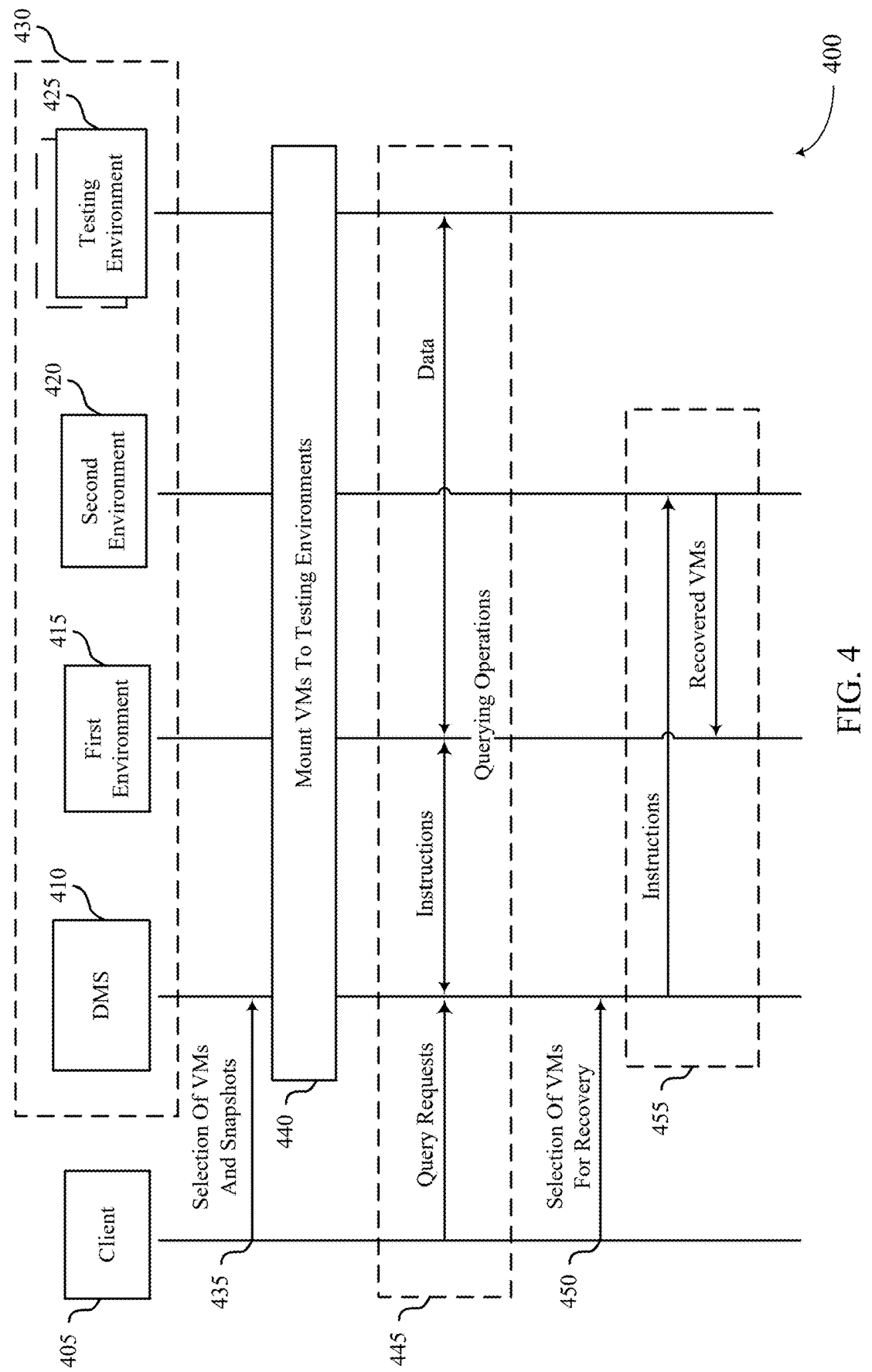
FIG. 4 illustrates an example of a process flow that supports investigation procedures for virtual machines in accordance with aspects of the present disclosure.

FIG. 4 illustrates an example of a process flow 400 that supports investigation procedures for VMs in accordance with aspects of the present disclosure. The process flow 400 may implement or be implemented by aspects of the computing environments 100 and 200 or the flow diagram 300, as described with reference to FIGS. 1-3. For example, the process flow 400 may be implemented by a client 405 (e.g., via a computing device 115) and a DMS 410, which may represent examples of corresponding devices as described with reference to FIGS. 1-3. The client 405, the DMS 410, or both may interface with one or more of a first environment 415, a second environment 420, and one or more testing environments 425.

In some aspects, the first environment 415 may represent an example of a production environment 230, and the second environment 420 may represent an example of a local cloud data management environment 215, as described with reference to FIG. 2. As such, the DMS 410, the first environment 415, the second environment 420, and the one or more testing environments 425 may, in some aspects, be located within a same computing system or environment 430, such as the computing system 205 described with reference to FIG. 2. In this example, the DMS 410 may facilitate investigation and recovery procedures for multiple VMs of the client 405.

In some aspects, the operations illustrated in the process flow 400 may be performed by hardware (e.g., including circuitry, processing blocks, logic components, and other components), code (e.g., software or firmware) executed by a processor, or any combination thereof. For example, aspects of the process flow 400 may be implemented or managed by a cloud data management service, an export adapter, or some other software or application within a DMS 410 that is configured to manage backup and restoration of data and other computing resources within one or more production environments. Alternative examples of the following may be implemented, where some steps are performed in a different order than described or are not performed at all. In some cases, steps may include additional features not mentioned below, or further steps may be added.

At 435, the client 405 may select one or more sets of VMs and corresponding snapshots for an investigation procedure. Each snapshot may represent or be associated with a respective version of the VMs (e.g., a point-in-time version of the VM that was previously backed up). The client 405 may access a user interface that may display VMs that execute within the first environment 415 of the client 405 and snapshots of the VMs that have been obtained by the DMS 410 and stored in the second environment 420 (e.g., a local cloud data management system). The client 405 may select the VMs and snapshots via the user interface. In some aspects, the client 405 may send a first indication to the DMS 410 to initiate the investigation and recovery procedure and a second indication that indicates the selection of the sets of VMs and corresponding snapshots. Additionally, or alternatively, the client 405 may send a single indication.

In some other aspects, an application of the DMS 410 may be configured to monitor the first environment 415 of the client for cyber-attacks and other security threats, and the application may send a first indication to the DMS 410 and the client 405 to initiate the investigation and recovery procedure. In such cases, the client 405 may send the second indication of the selection of the VMs and corresponding snapshots based on the first indication to initiate the procedure.

At 440, the DMS 410 may mount the selected sets of VMs to multiple testing environments 425 in response to receiving the indication to start the investigation and recovery procedure, the indication of the selected VMs and snapshots, or both. The testing environments 425 may be sandboxed or containerized environments that may be different from the first environment 415 and the second environment 420. In some aspects, the DMS 410 may mount a first set of one or more VMs to a respective testing environment 425 at the same time that the DMS 410 mounts one or more other sets of VMs to other testing environments 425, such that multiple VMs may be mounted to different environments in parallel. In some aspects, the client 405 may select the same VMs and different snapshots. In such cases, the DMS 410 may mount the same VMs to each testing environment 425, but the DMS 410 may use a different snapshot for each mount. As such, each testing environment 425 may access a different version of the VMs.

The mounting may use the selected snapshots stored in the second environment 420 to provide the testing environments 425 with query access to respective versions of the selected VMs, which may be hosted in the first environment 415 (e.g., a production environment). That is, the DMS 410 may retrieve snapshots that were previously obtained of the VMs and use the snapshots to recover a corresponding version of the VMs. The client 405 may access the recovered version of the VMs via the testing environments 425. The testing environments may be configured by the client 405, in some aspects, as described in further detail with reference to FIG. 3.

At 445, the DMS 410 may perform one or more querying operations between the first environment 415, the second environment 420, and the one or more testing environments 425 to facilitate the investigation procedure. Performing the querying operations may include providing the testing environments 425 with access to the respective versions of the VMs. That is, the snapshots of the VMs may be stored in the second environment 420 and the querying operations may provide access to versions of the VMs that are recovered from the snapshots. The client 405 may access the VMs via the testing environments 425.

In some aspects, to perform the querying operations, the client 405 may transmit one or more query requests to the DMS 410. In some aspects, the query requests may be transmitted to the DMS 410 via the testing environments 425. For example, the client may access the testing environments 425 and the requests may be redirected to the DMS 410. The DMS 410 may send instructions to the first environment 415, the second environment 420, or both based on the query requests. Access to relevant data from the snapshots stored in the second environment 420, the VMs hosted in the first environment 415, or both may then be provided to the client 405 via the testing environments 425 based on the request. The client may access the VMs to perform one or more testing or repair procedures.

At 450, in some aspects, the client 405 may select one or more VMs and corresponding snapshots for recovery to the first environment 415 (e.g., to replace one or more of the production VMs that were targeted in the cyber-attack). In some aspects, different versions of the same VM may be mounted across the testing environments 425 and the client 405 may test each version of the VM to determine a most reliable version of the VM for recovery. The client 405 may indicate the VM and a snapshot corresponding to the VM. Additionally, or alternatively, different VMs may be mounted across the different testing environments 425, and the client 405 may select a most reliable VM or set of VMs and corresponding snapshots. The client 405 may indicate the selected VMs and snapshots to the DMS 410 via the user interface.

At 455, the DMS 410 may facilitate a recovery procedure for the selected VMs. The DMS 410 may convey instructions to the second environment 420 that indicate the selected VMs and the recovery instructions for the selected VMs. The second environment 420 may retrieve the corresponding snapshots for the recovery. The VMs may be recovered to the first environment 415 using the snapshots. The recovery may include exporting the VMs to the first environment 415 or mounting the VMs to the first environment 415.

The techniques described herein may thereby provide for a DMS 410 to mount multiple VMs or multiple versions of a VM across different testing environments 425. A client 405 may access the mounted VMs using one or more querying operations to perform investigation procedures for the VMs. The client 405 may determine whether to recover one or more of the VMs to a production environment in response to a cyber-attack based on the investigation procedures.

Figure 5:
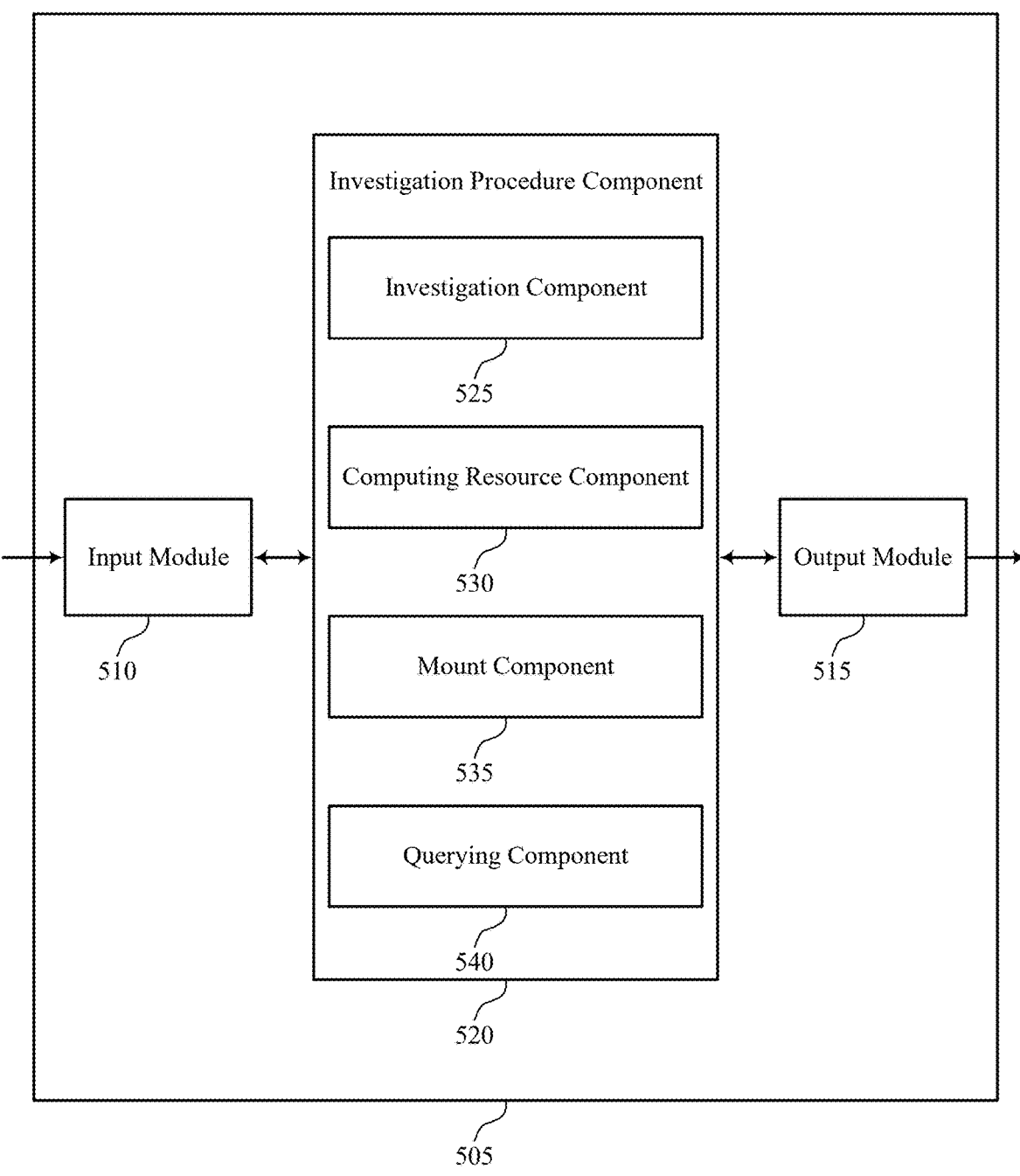
FIG. 5 shows a block diagram of an apparatus that supports investigation procedures for virtual machines in accordance with aspects of the present disclosure.

FIG. 5 shows a block diagram 500 of a system 505 that supports investigation procedures for VMs in accordance with aspects of the present disclosure. In some examples, the system 505 may be an example of aspects of one or more components described with reference to FIG. 1, such as a DMS 110. The system 505 may include an input interface 510, an output interface 515, and an investigation procedure component 520. The system 505 may also include one or more processors. Each of these components may be in communication with one another (e.g., via one or more buses, communications links, communications interfaces, or any combination thereof).

The input interface 510 may manage input signals for the system 505. For example, the input interface 510 may receive input signaling (e.g., messages, packets, data, instructions, commands, or any other form of encoded information) from other systems or devices. The input interface 510 may send signaling correspond to (e.g., representative of or otherwise based on) such input signaling to other components of the system 505 for processing. For example, the input interface 510 may transmit such corresponding signaling to the investigation procedure component 520 to support investigation procedures for VMs. In some cases, the input interface 510 may be a component of a network interface 710 as described with reference to FIG. 7.

The output interface 515 may manage output signaling for the system 505. For example, the output interface 515 may receive signaling from other components of the system 505, such as the investigation procedure component 520, such output signaling corresponding to (e.g., representative of or otherwise based on) such signaling to other systems or devices. In some cases, the output interface 515 may be a component of a network interface 710 as described with reference to FIG. 7.

For example, the investigation procedure component 520 may include an investigation component 525, a computing resource component 530, a mount component 535, a querying component 540, or any combination thereof. In some examples, the investigation procedure component 520, or various components thereof, may be configured to perform various operations (e.g., receiving, monitoring, transmitting) using or otherwise in cooperation with the input interface 510, the output interface 515, or both. For example, the investigation procedure component 520 may receive information from the input interface 510, send information to the output interface 515, or be integrated in combination with the input interface 510, the output interface 515, or both to receive information, transmit information, or perform various other operations as described herein.

The investigation component 525 may be configured as or otherwise support a means for receiving a first indication to initiate an investigation procedure for a set of multiple VMs hosted in a first environment. The computing resource component 530 may be configured as or otherwise support a means for receiving a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs. The mount component 535 may be configured as or otherwise support a means for mounting, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment. The querying component 540 may be configured as or otherwise support a means for performing one or more querying operations between the first environment including the set of multiple sets of VMs and the set of multiple testing environments as part of the investigation procedure.

Figure 6:
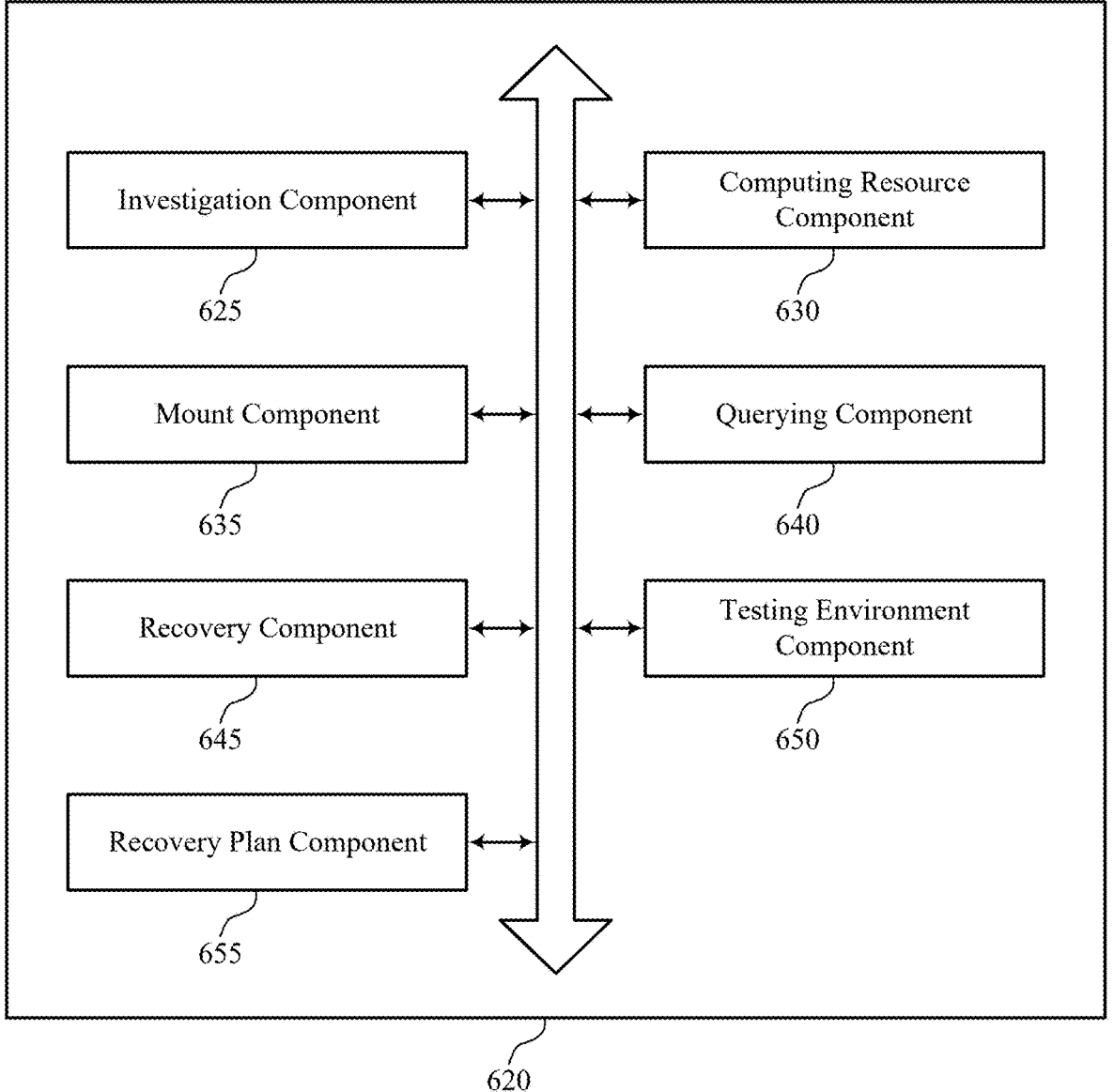
FIG. 6 shows a block diagram of an investigation procedure component that supports investigation procedures for virtual machines in accordance with aspects of the present disclosure.

FIG. 6 shows a block diagram 600 of an investigation procedure component 620 that supports investigation procedures for VMs in accordance with aspects of the present disclosure. The investigation procedure component 620 may be an example of aspects of an investigation procedure component or an investigation procedure component 520, or both, as described herein. The investigation procedure component 620, or various components thereof, may be an example of means for performing various aspects of investigation procedures for VMs as described herein. For example, the investigation procedure component 620 may include an investigation component 625, a computing resource component 630, a mount component 635, a querying component 640, a recovery component 645, a testing environment component 650, a recovery plan component 655, or any combination thereof. Each of these components may communicate, directly or indirectly, with one another (e.g., via one or more buses).

The investigation component 625 may be configured as or otherwise support a means for receiving a first indication to initiate an investigation procedure for a set of multiple VMs hosted in a first environment. The computing resource component 630 may be configured as or otherwise support a means for receiving a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs. The mount component 635 may be configured as or otherwise support a means for mounting, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment. The querying component 640 may be configured as or otherwise support a means for performing one or more querying operations between the first environment including the set of multiple sets of VMs and the set of multiple testing environments as part of the investigation procedure.

In some examples, to support performing the one or more querying operations, the querying component 640 may be configured as or otherwise support a means for providing the set of multiple testing environments access to the respective versions of the set of multiple sets of VMs to facilitate the investigation procedure for the set of multiple sets of VMs.

In some examples, the recovery component 645 may be configured as or otherwise support a means for receiving a third indication of a set of VMs selected for recovery from among the set of multiple sets of VMs and a corresponding snapshot selected for the recovery from among the corresponding set of multiple snapshots, where the set of VMs and the corresponding snapshot are selected for the recovery based on the investigation procedure for the set of multiple sets of VMs. In some examples, the recovery component 645 may be configured as or otherwise support a means for recovering, in response to the third indication, a respective version of the set of VMs to a production environment based on the corresponding snapshot stored in the second environment.

In some examples, the testing environment component 650 may be configured as or otherwise support a means for receiving parameters for the set of multiple testing environments. In some examples, the testing environment component 650 may be configured as or otherwise support a means for identifying the set of multiple testing environments in accordance with the parameters, where mounting the set of multiple sets of VMs to the set of multiple testing environments is based on identifying the set of multiple testing environments.

In some examples, the testing environment component 650 may be configured as or otherwise support a means for retrieving metadata associated with the set of multiple testing environments. In some examples, the testing environment component 650 may be configured as or otherwise support a means for validating the parameters for the set of multiple testing environments based on the metadata.

In some examples, the recovery plan component 655 may be configured as or otherwise support a means for generating a recovery plan that includes the selection of the set of multiple sets of VMs, the selection of the corresponding set of multiple snapshots, and one or more parameters associated with the set of multiple testing environments, the set of multiple sets of VMs, the corresponding set of multiple snapshots, or any combination thereof. In some examples, the recovery plan component 655 may be configured as or otherwise support a means for storing the recovery plan for subsequent investigation procedures.

In some examples, the investigation component 625 may be configured as or otherwise support a means for receiving a third indication to initiate a second investigation procedure. In some examples, the recovery plan component 655 may be configured as or otherwise support a means for performing the second investigation procedure in accordance with the stored recovery plan.

In some examples, the computing resource component 630 may be configured as or otherwise support a means for receiving, via the second indication, a set of computing resources, network resources, or both, where the mounting includes using the set of computing resources, network resources, or both to mount the set of multiple VMs to the set of multiple testing environments.

In some examples, the set of multiple sets of VMs and the corresponding set of multiple snapshots are selected in response to a ransomware attack on the set of multiple sets of VMs. In some examples, the set of multiple sets of VMs and the corresponding set of multiple snapshots are selected randomly. In some examples, the set of multiple sets of VMs include the same VMs, and the corresponding set of multiple snapshots are associated with different point-in-time versions of the same VMs. In some examples, the set of multiple testing environments include sandboxed environments.

Figure 7:
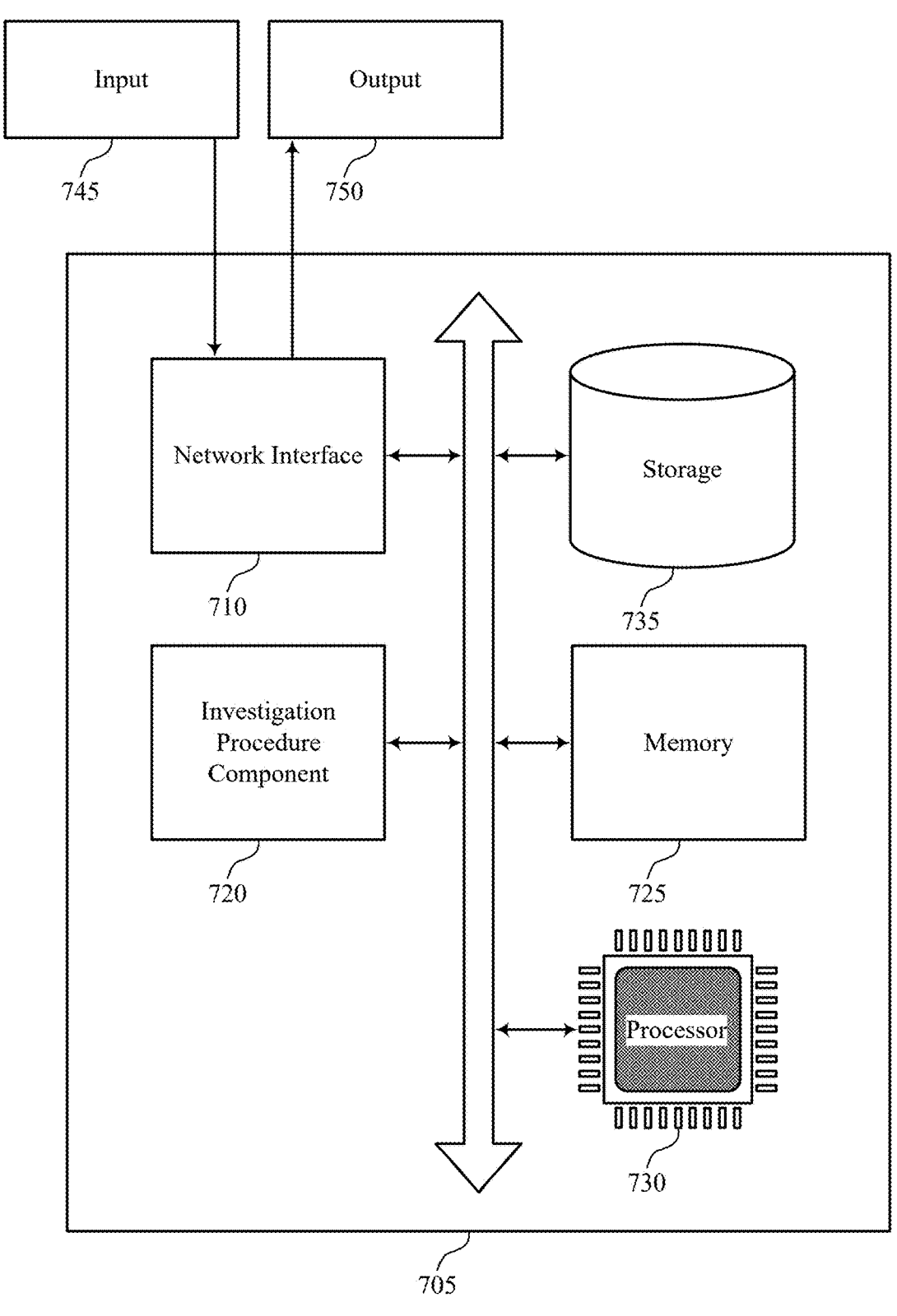
FIG. 7 shows a diagram of a system including a device that supports investigation procedures for virtual machines in accordance with aspects of the present disclosure.

FIG. 7 shows a block diagram 700 of a system 705 that supports investigation procedures for VMs in accordance with aspects of the present disclosure. The system 705 may be an example of or include aspects of a system 505 as described herein. The system 705 may include components for data management, including components such as an investigation procedure component 720, an network interface 710, a memory 725, a processor 730, and a storage 735. These components may be in electronic communication or otherwise coupled with each other (e.g., operatively, communicatively, functionally, electronically, electrically; via one or more buses, communications links, communications interfaces, or any combination thereof). Additionally, the components of the system 705 may comprise corresponding physical components or may be implemented as corresponding virtual components (e.g., components of one or more VMs). In some examples, the system 705 may be an example of aspects of one or more components described with reference to FIG. 1, such as a DMS 110.

The network interface 710 may enable the system 705 to exchange information (e.g., input information 745, output information 750, or both) with other systems or devices (not shown). For example, the network interface 710 may enable the system 705 to connect to a network (e.g., a network 120 as described herein). The network interface 710 may include one or more wireless network interfaces, one or more wired network interfaces, or any combination thereof. In some examples, the network interface 710 may be an example of may be an example of aspects of one or more components described with reference to FIG. 1, such as one or more network interfaces 165.

Memory 725 may include RAM, ROM, or both. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices. In some cases, the memory 725 may be an example of aspects of one or more components described with reference to FIG. 1, such as one or more memories 175.

The processor 730 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 730 may be configured to execute computer-readable instructions stored in a memory 725 to perform various functions (e.g., functions or tasks supporting configuration recovery for a data management system). Though a single processor 730 is depicted in the example of FIG. 7, it is to be understood that the system 705 may include any quantity of one or more of processors 730 and that a group of processors 730 may collectively perform one or more functions ascribed herein to a processor, such as the processor 730. In some cases, the processor 730 may be an example of aspects of one or more components described with reference to FIG. 1, such as one or more processors 170.

Storage 735 may be configured to store data that is generated, processed, stored, or otherwise used by the system 705. In some cases, the storage 735 may include one or more HDDs, one or more SDDs, or both. In some examples, the storage 735 may be an example of a single database, a distributed database, multiple distributed databases, a data store, a data lake, or an emergency backup database. In some examples, the storage 735 may be an example of one or more components described with reference to FIG. 1, such as one or more network disks 180.

For example, the investigation procedure component 720 may be configured as or otherwise support a means for receiving a first indication to initiate an investigation procedure for a set of multiple VMs hosted in a first environment. The investigation procedure component 720 may be configured as or otherwise support a means for receiving a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs. The investigation procedure component 720 may be configured as or otherwise support a means for mounting, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment. The investigation procedure component 720 may be configured as or otherwise support a means for performing one or more querying operations between the first environment including the set of multiple sets of VMs and the set of multiple testing environments as part of the investigation procedure.

By including or configuring the investigation procedure component 720 in accordance with examples as described herein, the system 705 may support techniques for improved data security and reduced latency and complexity associated with investigation procedures in response to a cyber-attack.

FIG. 8 shows a flowchart illustrating a method 800 that supports investigation procedures for VMs in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include receiving a first indication to initiate an investigation procedure for a set of multiple VMs hosted in a first environment. The operations of 805 may be performed in accordance with examples as disclosed herein. In some examples, aspects of the operations of 805 may be performed by an investigation component 625 as described with reference to FIG. 6.

At 810, the method may include receiving a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs. The operations of 810 may be performed in accordance with examples as disclosed herein. In some examples, aspects of the operations of 810 may be performed by a computing resource component 630 as described with reference to FIG. 6.

At 815, the method may include mounting, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment. The operations of 815 may be performed in accordance with examples as disclosed herein. In some examples, aspects of the operations of 815 may be performed by a mount component 635 as described with reference to FIG. 6.

At 820, the method may include performing one or more querying operations between the first environment including the set of multiple sets of VMs and the set of multiple testing environments as part of the investigation procedure. The operations of 820 may be performed in accordance with examples as disclosed herein. In some examples, aspects of the operations of 820 may be performed by a querying component 640 as described with reference to FIG. 6.

FIG. 9 shows a flowchart illustrating a method 900 that supports investigation procedures for VMs in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include receiving a first indication to initiate an investigation procedure for a set of multiple VMs hosted in a first environment. The operations of 905 may be performed in accordance with examples as disclosed herein. In some examples, aspects of the operations of 905 may be performed by an investigation component 625 as described with reference to FIG. 6.

At 910, the method may include receiving a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs. The operations of 910 may be performed in accordance with examples as disclosed herein. In some examples, aspects of the operations of 910 may be performed by a computing resource component 630 as described with reference to FIG. 6.

At 915, the method may include mounting, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment. The operations of 915 may be performed in accordance with examples as disclosed herein. In some examples, aspects of the operations of 915 may be performed by a mount component 635 as described with reference to FIG. 6.

At 920, the method may include performing one or more querying operations between the first environment including the set of multiple sets of VMs and the set of multiple testing environments as part of the investigation procedure. The operations of 920 may be performed in accordance with examples as disclosed herein. In some examples, aspects of the operations of 920 may be performed by a querying component 640 as described with reference to FIG. 6.

At 925, the method may include receiving a third indication of a set of VMs selected for recovery from among the set of multiple sets of VMs and a corresponding snapshot selected for the recovery from among the corresponding set of multiple snapshots, where the set of VMs and the corresponding snapshot are selected for the recovery based on the investigation procedure for the set of multiple sets of VMs. The operations of 925 may be performed in accordance with examples as disclosed herein. In some examples, aspects of the operations of 925 may be performed by a recovery component 645 as described with reference to FIG. 6.

At 930, the method may include recovering, in response to the third indication, a respective version of the set of VMs to a production environment based on the corresponding snapshot stored in the second environment. The operations of 930 may be performed in accordance with examples as disclosed herein. In some examples, aspects of the operations of 930 may be performed by a recovery component 645 as described with reference to FIG. 6.

FIG. 10 shows a flowchart illustrating a method 1000 that supports investigation procedures for VMs in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include receiving a first indication to initiate an investigation procedure for a set of multiple VMs hosted in a first environment. The operations of 1005 may be performed in accordance with examples as disclosed herein. In some examples, aspects of the operations of 1005 may be performed by an investigation component 625 as described with reference to FIG. 6.

At 1010, the method may include receiving a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs. The operations of 1010 may be performed in accordance with examples as disclosed herein. In some examples, aspects of the operations of 1010 may be performed by a computing resource component 630 as described with reference to FIG. 6.

At 1015, the method may include mounting, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment. The operations of 1015 may be performed in accordance with examples as disclosed herein. In some examples, aspects of the operations of 1015 may be performed by a mount component 635 as described with reference to FIG. 6.

At 1020, the method may include performing one or more querying operations between the first environment including the set of multiple sets of VMs and the set of multiple testing environments as part of the investigation procedure. The operations of 1020 may be performed in accordance with examples as disclosed herein. In some examples, aspects of the operations of 1020 may be performed by a querying component 640 as described with reference to FIG. 6.

At 1025, the method may include generating a recovery plan that includes the selection of the set of multiple sets of VMs, the selection of the corresponding set of multiple snapshots, and one or more parameters associated with the set of multiple testing environments, the set of multiple sets of VMs, the corresponding set of multiple snapshots, or any combination thereof. The operations of 1025 may be performed in accordance with examples as disclosed herein. In some examples, aspects of the operations of 1025 may be performed by a recovery plan component 655 as described with reference to FIG. 6.

At 1030, the method may include storing the recovery plan for subsequent investigation procedures. The operations of 1030 may be performed in accordance with examples as disclosed herein. In some examples, aspects of the operations of 1030 may be performed by a recovery plan component 655 as described with reference to FIG. 6.

A method is described. The method may include receiving a first indication to initiate an investigation procedure for a set of multiple VMs hosted in a first environment, receiving a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs, mounting, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment, and performing one or more querying operations between the first environment including the set of multiple sets of VMs and the set of multiple testing environments as part of the investigation procedure.

An apparatus is described. The apparatus may include a processor, memory coupled with the processor, and instructions stored in the memory. The instructions may be executable by the processor to cause the apparatus to receive a first indication to initiate an investigation procedure for a set of multiple VMs hosted in a first environment, receive a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs, mount, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment, and perform one or more querying operations between the first environment including the set of multiple sets of VMs and the set of multiple testing environments as part of the investigation procedure.

Another apparatus is described. The apparatus may include means for receiving a first indication to initiate an investigation procedure for a set of multiple VMs hosted in a first environment, means for receiving a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs, means for mounting, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment, and means for performing one or more querying operations between the first environment including the set of multiple sets of VMs and the set of multiple testing environments as part of the investigation procedure.

A non-transitory computer-readable medium storing code is described. The code may include instructions executable by a processor to receive a first indication to initiate an investigation procedure for a set of multiple VMs hosted in a first environment, receive a second indication of a selection of a set of multiple sets of VMs and a corresponding set of multiple snapshots for the investigation procedure, where the corresponding set of multiple snapshots are stored in a second environment, and where a snapshot of the corresponding set of multiple snapshots is associated with a version of a respective set of VMs of the set of multiple sets of VMs, mount, in response to receiving the first indication and the second indication, the set of multiple sets of VMs to a set of multiple testing environments different than the first environment and the second environment, where the mounting uses the set of multiple snapshots to provide the set of multiple testing environments with query access to respective versions of the set of multiple sets of VMs hosted in the first environment, and perform one or more querying operations between the first environment including the set of multiple sets of VMs and the set of multiple testing environments as part of the investigation procedure.

In some examples of the method, apparatuses, and non-transitory computer-readable medium described herein, performing the one or more querying operations may include operations, features, means, or instructions for providing the set of multiple testing environments access to the respective versions of the set of multiple sets of VMs to facilitate the investigation procedure for the set of multiple sets of VMs.

Some examples of the method, apparatuses, and non-transitory computer-readable medium described herein may further include operations, features, means, or instructions for receiving a third indication of a set of VMs selected for recovery from among the set of multiple sets of VMs and a corresponding snapshot selected for the recovery from among the corresponding set of multiple snapshots, where the set of VMs and the corresponding snapshot may be selected for the recovery based on the investigation procedure for the set of multiple sets of VMs and recovering, in response to the third indication, a respective version of the set of VMs to a production environment based on the corresponding snapshot stored in the second environment.

Some examples of the method, apparatuses, and non-transitory computer-readable medium described herein may further include operations, features, means, or instructions for receiving parameters for the set of multiple testing environments and identifying the set of multiple testing environments in accordance with the parameters, where mounting the set of multiple sets of VMs to the set of multiple testing environments may be based on identifying the set of multiple testing environments.

Some examples of the method, apparatuses, and non-transitory computer-readable medium described herein may further include operations, features, means, or instructions for retrieving metadata associated with the set of multiple testing environments and validating the parameters for the set of multiple testing environments based on the metadata.

Some examples of the method, apparatuses, and non-transitory computer-readable medium described herein may further include operations, features, means, or instructions for generating a recovery plan that includes the selection of the set of multiple sets of VMs, the selection of the corresponding set of multiple snapshots, and one or more parameters associated with the set of multiple testing environments, the set of multiple sets of VMs, the corresponding set of multiple snapshots, or any combination thereof and storing the recovery plan for subsequent investigation procedures.

Some examples of the method, apparatuses, and non-transitory computer-readable medium described herein may further include operations, features, means, or instructions for receiving a third indication to initiate a second investigation procedure and performing the second investigation procedure in accordance with the stored recovery plan.

Some examples of the method, apparatuses, and non-transitory computer-readable medium described herein may further include operations, features, means, or instructions for receiving, via the second indication, a set of computing resources, network resources, or both, where the mounting includes using the set of computing resources, network resources, or both to mount the set of multiple VMs to the set of multiple testing environments.

In some examples of the method, apparatuses, and non-transitory computer-readable medium described herein, the set of multiple sets of VMs and the corresponding set of multiple snapshots may be selected in response to a ransomware attack on the set of multiple sets of VMs.

In some examples of the method, apparatuses, and non-transitory computer-readable medium described herein, the set of multiple sets of VMs and the corresponding set of multiple snapshots may be selected randomly.

In some examples of the method, apparatuses, and non-transitory computer-readable medium described herein, the set of multiple sets of VMs include the same VMs, and the corresponding set of multiple snapshots may be associated with different point-in-time versions of the same VMs.

In some examples of the method, apparatuses, and non-transitory computer-readable medium described herein, the set of multiple testing environments include sandboxed environments.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital sub-scriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data mag-netically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

receiving an indication of a virtual machine, hosted in a first environment, for instantiation within an isolated recovery environment different from the first environ-ment, the virtual machine corresponding to a snapshot, the snapshot stored in a second environment different from the first environment and the isolated recovery environment; and creating a target resource in the isolated recovery envi-ronment, the target resource configured for instantia-tion of a respective version of the virtual machine using the snapshot, the snapshot corresponding to the respec-tive version of the virtual machine, wherein communication of data corresponding to the respective version of the virtual machine is enabled between the isolated recovery environment and a computing system external to the isolated recovery environment based at least in part on the respective version of the virtual machine being instantiated within the isolated recovery environment using the target resource and the snapshot.

2. The method of claim 1, wherein the computing system external to the isolated recovery environment comprises support associated with an external online service.

3. The method of claim 2, wherein the external online service utilizes a testing procedure.

4. The method of claim 1, wherein the isolated recovery environment comprises a sandboxed environment.

5. The method of claim 1, wherein resources in the first environment are quarantined from the target resource in the isolated recovery environment based at least in part on the isolated recovery environment being isolated from the first environment.

6. The method of claim 1, further comprising:

instantiating the respective version of the virtual machine in the isolated recovery environment.

7. The method of claim 6, further comprising:

performing an investigation on the respective version of the virtual machine using an incident response script.

8. A system comprising:

at least one processor;

memory coupled with the at least one processor; and instructions stored in the memory and executable by the at least one processor to cause the system to:

receive an indication of a virtual machine, hosted in a first environment, for instantiation within an isolated recovery environment different from the first envi-ronment, the virtual machine corresponding to a snapshot, the snapshot stored in a second environ-ment different from the first environment and the isolated recovery environment; and create a target resource in the isolated recovery envi-ronment, the target resource configured for instan-tiation of a respective version of the virtual machine using the snapshot, the snapshot corresponding to the respective version of the virtual machine, wherein communication of data corresponding to the respective version of the virtual machine is enabled between the isolated recovery environ-ment and a computing system external to the isolated recovery environment based at least in part on the respective version of the virtual machine being instantiated within the isolated recovery environment using the target resource and the snapshot.

9. The system of claim 8, wherein the computing system external to the isolated recovery environment comprises support associated with an external online service.

10. The system of claim 9, wherein the external online service utilizes a testing procedure.

11. The system of claim 8, wherein the isolated recovery environment comprises a sandboxed environment.

12. The system of claim 8, wherein resources in the first environment are quarantined from the target resource in the isolated recovery environment based at least in part on the isolated recovery environment being isolated from the first environment.

13. The system of claim 8, wherein the instructions are further executable by the at least one processor to cause the system to:

instantiate the respective version of the virtual machine in the isolated recovery environment.

14. The system of claim 13, wherein the instructions are further executable by the at least one processor to cause the system to:

perform an investigation on the respective version of the virtual machine using an incident response script.

15. A non-transitory computer-readable medium storing code, the code comprising instructions executable by at least one processor to:

receive an indication of a virtual machine, hosted in a first environment, for instantiation within an isolated recov-ery environment different from the first environment, the virtual machine corresponding to a snapshot, the snapshot stored in a second environment different from the first environment and the isolated recovery envi-ronment; and create a target resource in the isolated recovery environ-ment, the target resource configured for instantiation of a respective version of the virtual machine using the snapshot, the snapshot corresponding to the respective version of the virtual machine, wherein communication of data corresponding to the respective version of the virtual machine is enabled between the isolated recovery environment and a computing system external to the isolated recovery environment based at least in part on the respective version of the virtual machine being instantiated within the isolated recovery environment using the target resource and the snapshot.

16. The non-transitory computer-readable medium of claim 15, wherein the computing system external to the isolated recovery environment comprises support associated with an external online service.

17. The non-transitory computer-readable medium of claim 15, wherein the isolated recovery environment comprises a sandboxed environment.

18. The non-transitory computer-readable medium of claim 15, wherein resources in the first environment are quarantined from the target resource in the isolated recovery environment based at least in part on the isolated recovery environment being isolated from the first environment.

19. The non-transitory computer-readable medium of claim 15, wherein the instructions are further executable by the at least one processor to:

instantiate the respective version of the virtual machine in the isolated recovery environment.

20. The non-transitory computer-readable medium of claim 19, wherein the instructions are further executable by the at least one processor to:

perform an investigation on the respective version of the virtual machine using an incident response script.

\* \* \* \* \*